(12) United States Patent
McComb et al.

(10) Patent No.: US 9,397,466 B2
(45) Date of Patent: Jul. 19, 2016

(54) HIGH POWER CHIRALLY COUPLED CORE OPTICAL AMPLIFICATION SYSTEMS AND METHODS

(71) Applicant: nLIGHT Photonics Corporation, Vancouver, WA (US)

(72) Inventors: Timothy S. McComb, Portland, OR (US); Roger L. Farrow, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 14/329,484

(22) Filed: Jul. 11, 2014

(65) Prior Publication Data
US 2016/0013607 A1 Jan. 14, 2016

(51) Int. Cl.
*H01S 3/067* (2006.01)
*H01S 3/094* (2006.01)
*H01S 3/10* (2006.01)
*H01S 3/109* (2006.01)

(52) U.S. Cl.
CPC ......... *H01S 3/06754* (2013.01); *H01S 3/06704* (2013.01); *H01S 3/06729* (2013.01); *H01S 3/094003* (2013.01); *H01S 3/109* (2013.01); *H01S 3/10053* (2013.01); *H01S 3/10061* (2013.01); *H01S 3/10084* (2013.01)

(58) Field of Classification Search
CPC ............ H01S 3/06704; H01S 3/06729; H01S 3/06754; H01S 3/094003; H01S 3/10053; H01S 3/10061; H01S 3/10084; H01S 3/108; H01S 3/109
See application file for complete search history.

(56) References Cited

U.S. PATENT DOCUMENTS

| | | | |
|---|---|---|---|
| 4,315,666 A | 2/1982 | Hicks, Jr. | |
| 4,372,645 A | 2/1983 | Miller | |
| 4,555,177 A * | 11/1985 | Barrett | ......................... 356/318 |
| 6,282,016 B1 * | 8/2001 | MacCormack | ..... H01S 3/06758 359/341.4 |
| 6,422,043 B1 | 7/2002 | Di Giovanni et al. | |
| 6,427,491 B1 | 8/2002 | Burke et al. | |
| 6,480,637 B1 | 11/2002 | Yao | |
| 6,496,301 B1 | 12/2002 | Koplow et al. | |
| 6,650,664 B1 * | 11/2003 | Moore | ............. H01S 3/094003 372/19 |
| 7,424,193 B2 | 9/2008 | Galvanauskas | |
| 7,787,729 B2 | 8/2010 | Dong et al. | |

(Continued)

FOREIGN PATENT DOCUMENTS

WO    WO 2011/091316    7/2011

OTHER PUBLICATIONS

Amans et al., "Vector modulation instability induced by vacuum fluctuations in highly birefringent fibers in the anomalous-dispersion regime," Optics Letters 30(9):1051-1053 (May 1, 2005).
Clark, "Temperature-stable spun elliptical-core optical-fiber current transducer," Optics Letters, vol. 18, No. 2, pp. 158-160 (Jan. 15, 1993).
International Search Report and Written Opinion for International Application No. PCT/US2014/030698, mailed Oct. 14, 2014.

(Continued)

*Primary Examiner* — Armando Rodriguez
(74) *Attorney, Agent, or Firm* — Klarquist Sparkman, LLP

(57) ABSTRACT

An optical amplification system is disclosed which includes a seed source providing a seed beam, and a chirally coupled core fiber amplifier optically coupled to the seed beam and configured to convert the coupled seed beam into an amplifier output beam, wherein the polarization of the seed beam is controllably launched into the chirally coupled core fiber in order to reduce nonlinearities in the amplifier output beam. Peak output powers in excess of 500 kW can be realized for short-pulsed single-mode beams having mode field diameters greater than 30 μm.

26 Claims, 7 Drawing Sheets

(56) References Cited

U.S. PATENT DOCUMENTS

| | | |
|---|---|---|
| 7,809,224 B2 | 10/2010 | Galvanauskas |
| 8,098,970 B2 | 1/2012 | Galvanauskas |
| 8,351,111 B2 | 1/2013 | Di Giovanni et al. |
| 8,406,594 B2 | 3/2013 | Alkeskjold |
| 8,582,609 B2 | 11/2013 | Tong et al. |
| 2003/0118266 A1 | 6/2003 | Kopp et al. |
| 2003/0231690 A1 | 12/2003 | McDonald |
| 2004/0246568 A1* | 12/2004 | Onaka et al. .................. 359/337 |
| 2005/0238364 A1* | 10/2005 | Leonardus Jennen ........ 398/152 |
| 2008/0101754 A1 | 5/2008 | Parker et al. |
| 2009/0047014 A1* | 2/2009 | Irie ................................. 398/23 |
| 2009/0052840 A1 | 2/2009 | Kojima et al. |
| 2009/0262761 A1* | 10/2009 | Khitrov ............................. 372/6 |
| 2013/0063808 A1 | 3/2013 | Rothenberg |
| 2013/0291603 A1 | 11/2013 | Guertin et al. |

OTHER PUBLICATIONS

International Search Report and Written Opinion for International Application No. PCT/US2015/013583, 7 pages, mailed Jun. 4, 2015.

Sosnowski et al., "3C Yb-doped Fiber Based High Energy and Power Pulsed Fiber Lasers," nLight Corporation, pp. 1-11 (Mar. 1, 2012).

Tjugiarto et al., "Couplings in spun twin-core optical fibers," Optics Letters, vol. 17, No. 15, pp. 1058-1060 (Aug. 1, 1992).

Wang et al., "Efficient single-mode operation of a cladding-pumped ytterbium-doped helical-core fiber laser," Optics Letters, vol. 31, No. 2, pp. 226-228 (Jan. 15, 2006).

Galvanauskas et al., "Next Generation Large Mode Area Fiber Technologies for High Power Fiber Laser Arrays," Final Report, University of Michigan, 20 pages, Jun. 8, 2012.

International Search Report and Written Opinion for International Application No. PCT/US2015/040018, 6 pages, mailed Nov. 5, 2015.

\* cited by examiner

HIGH POWER CHIRALLY COUPLED CORE OPTICAL AMPLIFICATION SYSTEMS AND METHODS

BACKGROUND OF THE INVENTION

1. Field of the Invention

Generally, the field of the present invention is high power optical amplification systems. More particularly, the present invention relates to high power optical amplification systems and methods utilizing chirally coupled core optical fibers.

2. Background

Laser systems have enjoyed successful penetration into a wide array of applications in the last several decades, both increasing efficiencies and enabling new technologies in material processing, drilling, electronic device manufacturing, and in other industrial and defense-related spaces. In particular, the advent of the fiber laser and fiber amplifier have allowed for even more applications, and enhancement of existing ones, as superior beam quality can be obtained in a fiber laser or fiber amplifier output beam due to the intrinsic nature of a fiber optic waveguide.

In particular, chirally coupled core fibers present a significant breakthrough in the performance of fiber lasers and amplifiers as they enable very large fundamental mode field diameters while maintaining diffraction limited beam quality, among other unique features. However, because chirally coupled core fibers are typically rotated during fabrication to form a helical geometry within the fiber, importing a conventional polarization maintaining design, such as panda or bowtie, is not practical. This is because the polarization maintaining elements become rotated as well, causing the intrinsic birefringence they impart to rotate, thereby removing the ability to maintain a stable linear polarization. Moreover, as peak powers increase, effective limits on maximum achievable power surface due to the onset of parasitic nonlinear effects. Accordingly, there remains a need for systems employing chirally coupled core fibers without the attendant drawbacks.

SUMMARY OF THE INVENTION

According to one aspect of the present invention, an optical amplification system includes a seed source providing a seed beam, and a chirally coupled core fiber amplifier optically coupled to the seed beam and configured to convert the coupled seed beam into an amplified output beam, wherein the polarization of the seed beam is controllably launched into the chirally coupled core fiber in order to reduce nonlinearities in the amplifier output beam.

According to another aspect of the present invention, a high power master oscillator fiber amplifier system includes a master oscillator seed source providing a seed beam, and a chirally coupled core fiber amplifier optically coupled to the seed beam, the chirally coupled core fiber amplifier configured to provide an amplified output beam, the chirally coupled core fiber amplifier being coiled at a coiled radius and having a pair of orthogonal birefringence axes associated therewith, wherein the polarization of the seed beam coupled into the chirally coupled fiber amplifier is controlled to reduce nonlinearities in the amplified output beam According to a further aspect of the present invention, a method of optical amplification with a chirally coupled core fiber includes emitting a seed beam from a seed source, coupling a controlled polarization of the seed beam into a chirally coupled core fiber amplifier in order to optimize the amplified output thereof, and amplifying the coupled seed beam with the chirally coupled core amplifier.

The foregoing and other objects, features, and advantages will become more apparent from the following detailed description, which proceeds with reference to the accompanying figures which are not necessarily drawn to scale.

DETAILED DESCRIPTION OF THE INVENTION

Figure 1:
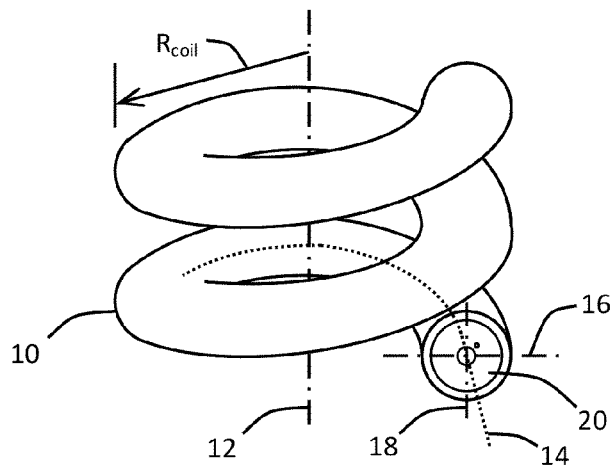
FIG. 1 is a perspective view of a coiled fiber in accordance with an aspect of the present invention.

Referring now to FIG. 1, there is shown an exemplary active chirally coupled core fiber 10 coiled about a coiling axis 12 normal to a coiling plane. The fiber 10 includes a fiber axis 14 extending longitudinally along the fiber length. Due to the fiber coiling, and with reference to a fiber cross-section 20, a pair of birefringent axes 16, 18 is formed in the plane and normal to the plane of the fiber coil. Fiber cross-section 20 can also be an input face of a proximal end of the fiber 10 for light, such as a seed beam, to be coupled therein along the fiber axis 14. When fiber 10 is configured as an optical fiber amplifier, the seed beam coupled into the fiber 10 becomes amplified into a high energy output beam emitted from a distal end of the fiber 10. A coiling radius, $R_{coil}$, is associated with the coiled fiber 10 and provides a convenient way to package the fiber in a high power laser system. The coiling radius can be fixed or variable, including as a function of fiber length, distance, coiling axis position, etc.

Figure 2:
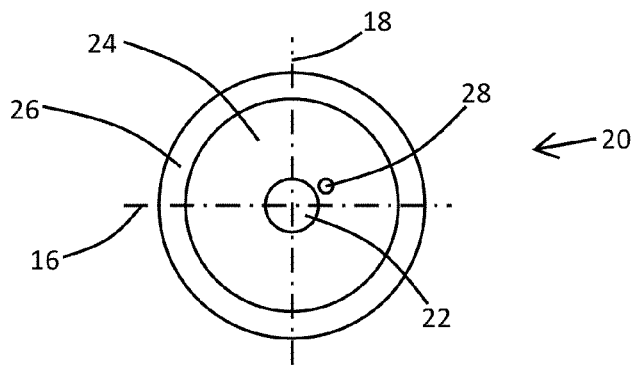
FIG. 2 is a cross-sectional view of the input face of a coiled fiber in accordance with another aspect of the present invention.

In FIG. 2, an expanded view of the cross-section 20 of the fiber 10 is shown and depicts one example of a chirally coupled core fiber structure. The chirally coupled core fiber 10 includes a core 22, inner cladding 24, and outer cladding 26, similar to a double-clad fiber. However, in the depicted example a satellite core 28 is also included which is helically wound about the core 22 along the length of the fiber 10. The helical periodicity and other geometry-dependent or design-dependent parameters are carefully selected to provide a phase-matching or quasi-phase-matching effect operative to couple selected optical modes (typically higher order modes) out of the core 22 while coupling other selected optical modes (typically the fundamental mode) out of the core 22 to a lesser degree. While different modes can be selected, typically the periodicity is configured such that all higher order modes are substantially attenuated leaving only the fundamental $TEM_{00}$ mode propagating in the fiber waveguide. A beam in the fundamental transverse mode offers the highest beam quality and is, or is most nearly, diffraction limited, offering superior performance for a host of applications.

As mentioned before, the selected modes are coupled out of the core 22 due to the carefully selected parameters of the helical fiber geometry. The selected modes are coupled into the satellite core 28 or inner cladding 24 and attenuated. With this effect, the core 22 can be configured with a larger diameter than conventional large mode area fibers used in high power fiber lasers and fiber amplifiers. The larger core supports a beam with a larger mode field diameter even while propagating substantially in only the fundamental mode. One particular advantage of a larger mode field diameter is the ability to amplify beams to higher peak powers than conventional fibers since the onset of undesirable nonlinear optical effects is generally pushed out to longer fiber lengths or larger signal gain. For example, chirally coupled core fibers can include core diameters, and similar beam effective mode field diameters, of about 20 μm, 30 μm, 50 μm, 80 μm, or greater.

While FIG. 2 shows the cross-section 20 of one straightforward example of a chirally coupled core fiber cross-section, it will be appreciated a large variety of fiber geometries and designs are possible, include ones with multiple satellite cores or none at all. Accordingly, chirally coupled core fibers as defined herein can include any optical fiber configured with a phase-matched or quasi-phase-matched helical attribute that provides high power optical propagation in one or more selected optical modes and attenuation of other optical modes. Thus, the helical attribute can generally be understood to manifest as a rotational function with respect to fiber length. Chirally coupled core fibers can be manufactured by selecting a particular geometry or design using one or more fiber preforms, and by spinning and drawing the fiber according to one or more rotational rates and rotational directions.

Figure 3:
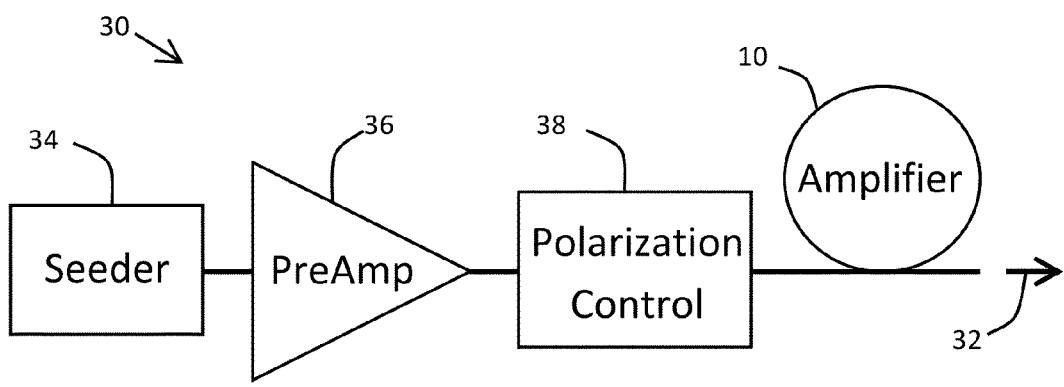
FIG. 3 is a schematic of a high power optical amplification system in accordance with another aspect of the present invention.

In FIG. 3, a schematic of an optical amplification system 30 is shown which utilizes an active chirally coupled core fiber 10 to create a highly amplified pulsed output beam 32. The system 30 includes a seeder 34 which provides a pulsed source at low power to form the basis for the highly amplified pulsed output beam 32. The seeder 34 is optically coupled to one or more amplification stages, such as a preamplifier 36 which is typically a single-mode active fiber. In general herein, the term "optical coupling" and "optically coupled" can include a fiber splice, free space coupling (such as with lenses or mirrors), mode field adapters or tapered fibers, optical combiners, or other optical coupling methods and devices. Moreover, optical couplings between different elements can be direct or indirect, allowing additional elements to be disposed along the path of an optical beam for different purposes (e.g., optical isolation, homogenization, beam delivery, pump coupling, etc.). A polarization controller 38 is optically coupled to the preamplifier 36 and is configured to control the polarization state of the preamplified beam such that the beam is passed to the chirally coupled core amplifier fiber 10 in a predetermined polarization state.

It has been observed that chirally coupled core fibers exhibit unique nonlinear effects, not typically observed in conventional large mode area fibers, which may be attributed in part to vector modulation instability. Such unique effects include spectral growth suggestive of four-wave mixing (FWM), suppression of stimulated Raman scattering (SRS), and nonlinear polarization rotation which also produces polarization-dependent effects in the temporal regime. In many applications, the four wave mixing and polarization rotation effects are undesirable as they can limit the maximum achievable peak power in short pulsed, high peak power optical amplification systems. Furthermore, the spectrum for pulses exhibiting such undesirable nonlinear effects has been observed to be extensive, in some examples ranging from about 800 nm to about 1500 nm in wavelength, causing leakage through optics in the high power laser system, potentially causing pump laser damage or system failure. Such effects also limit the utility of such lasers systems for harmonic generation via nonlinear optical process which typically have narrow phase matching bandwidths and require known, stable linear polarization states.

Figure 4:
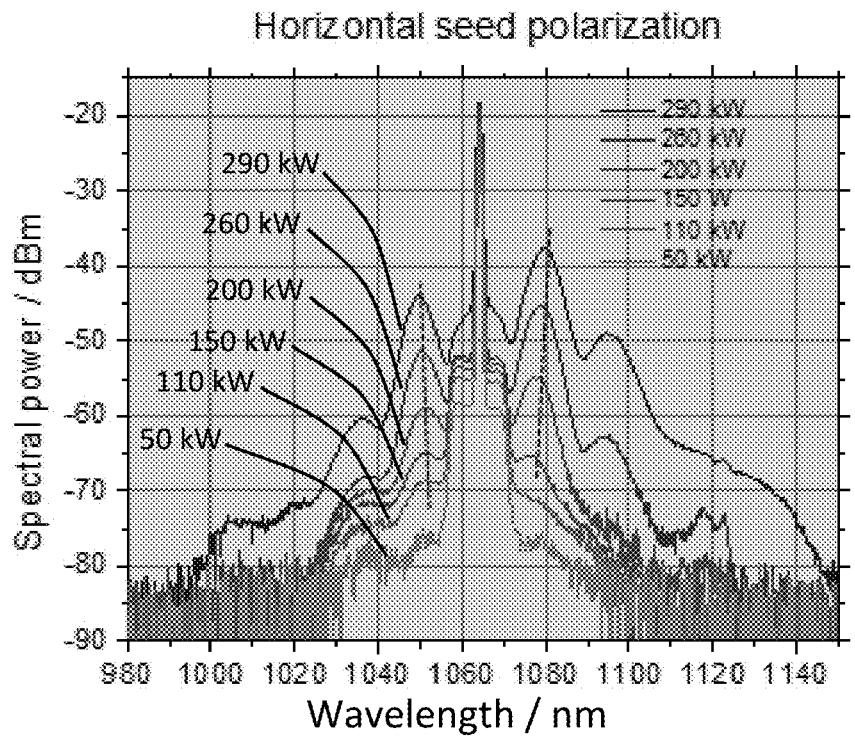
FIG. 4 is a plot of spectral power against wavelength for various output powers.

However, it has been found that by controlling the launch condition of the input polarization state of a beam coupled to the chirally coupled core fiber, the onset of nonlinear effects can be controlled and consequently nonlinear effects can be reduced. This effect is shown more clearly with reference to FIGS. 4 and 5. In FIG. 4, a chart of spectral power according to wavelength is shown for different peak power levels associated with chirally coupled core fiber amplifier output beams. The amplifier output beams centered at a wavelength of about 1064 nm are produced with an in-coupled beam, such as a seed beam, having a linear, or plane-polarized, polarization state. "Seed beam" as used herein can refer to the beam emitted directly from a seed source, as well as the beam having undergone different modifications, such as preamplification, amplification, isolation, filtration, etc. The seed beam is optically coupled into the 33 μm core diameter chirally coupled core fiber amplifier such that the linear polarization state of the seed beam is substantially aligned with, a birefringent axis of the amplifier fiber. As can be seen from the chart, as output beam power increases in relatively linear fashion from about 50 kW to 290 kW, several adjacent spectral lobes, associated with parasitic nonlinear effects, increase exponentially. At lower powers the optimized alignment condition for polarization launch is a linear polarization state in alignment with, or aligned perpendicular to, the coiling plane (i.e., the first or second birefringent axes of the coiled chirally coupled core amplifier fiber), which is the same alignment for beams produced in this Figure. Standard polarization maintaining fibers have axes of birefringence by the designed-in stress inducing elements, requiring polarization launch along one of those axes to enable stable polarization maintaining operation. Since chirally coupled core fibers do not typically have an inherent internal birefringence, fiber coiling could be considered as a way to induce birefringence therein and thereby select a similar launch condition as conventional polarization maintaining fibers by launching along the birefringent axes induced by coiling so as to expect stable operation.

Figure 5:
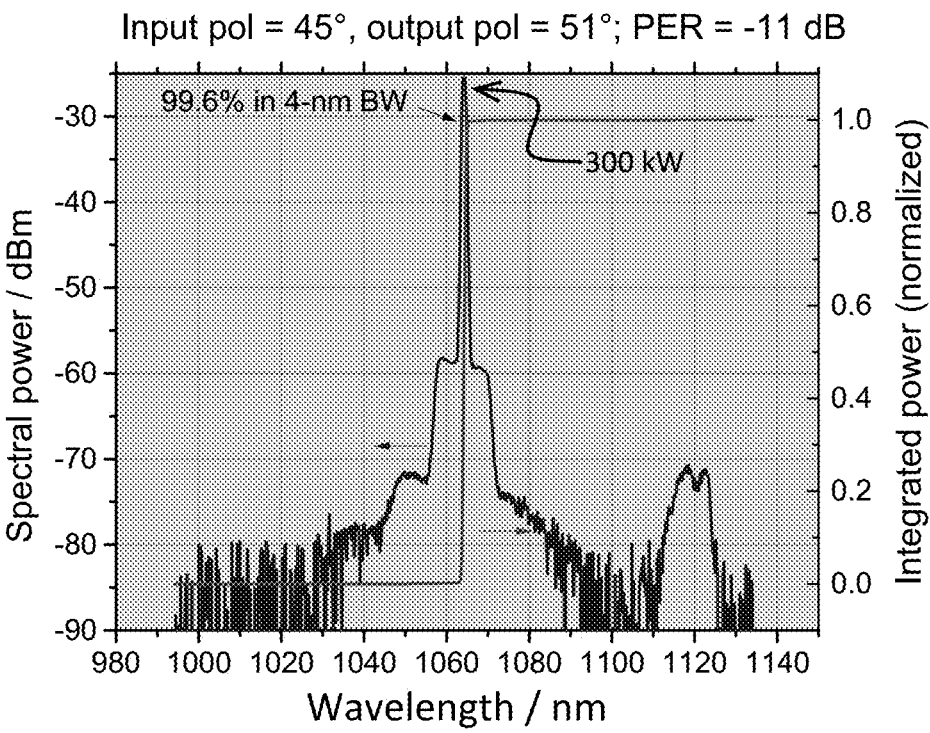
FIG. 5 is a plot of spectral power against wavelength for a selected output power.

As shown in FIG. 5, a similar seed beam is coupled into a 33 μm core chirally coupled core fiber amplifier to produce an output beam having a 300 kW peak power with an output wavelength of about 1064 nm. The seed beam also has a linear, or plane-polarized, polarization state but the plane axis thereof is arranged at 45 degrees with respect to a birefringent axis of the chirally coupled core fiber amplifier. Noticeably, about 99.6% of output beam power is shown to be contained within a 4 nm bandwidth window while adjacent spectral lobes are absent, indicating nonlinear effects have been strongly suppressed, even while the output beam peak power is larger than each of the output beam peak powers shown in FIG. 4 which use a configuration with the in-coupled beam having a linear polarization state aligned with an amplifier axis of birefringence. In general, larger peak powers can be obtained with a larger core diameter in the chirally coupled core fiber amplifier. For example, 33 µm core diameters can typically allow peak powers in the range of 300-500 kW while 55 µm core diameters may allow 500 kW to 1 MW. Larger core diameters, such as 80 µm, may be able to provide peak powers in the range of 2-4 MW before a self-focusing limit is reached.

Accordingly, by utilizing the polarization controls described herein, a dramatic increase in peak power, including peak powers of more than 500 kW, can be achievable in high power optical amplification systems before parasitic nonlinear effects are observed. In some exemplary optical amplification systems herein a fixed polarization control can be used while in other exemplary optical amplification systems herein a variable polarization control can be used. Variable polarization control is particularly suited for systems capable of variable peak power output or for tuning in view with other system parameters. For example, polarization state outputs could vary amongst a group or lot of seed sources or amongst different types of seed sources, or variation could occur for a particular source, such as in a time-dependent or temperature dependent manner. In this sense, in some examples an unspecified seed polarization can be used to form an optimized amplifier output.

Figure 6:
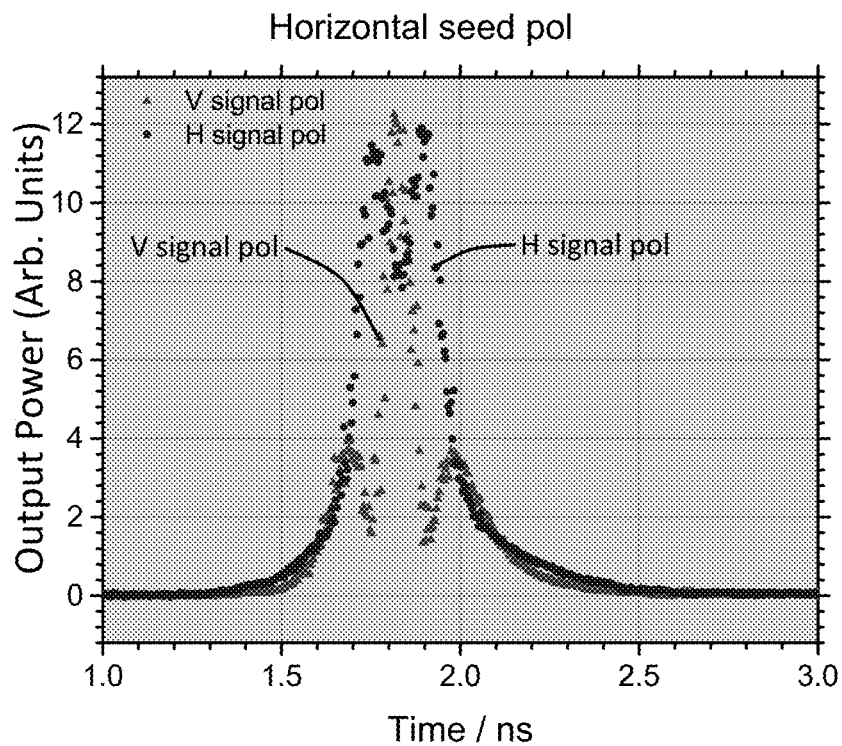
FIG. 6 is a plot of output power versus time for different polarization states.
Figure 7:
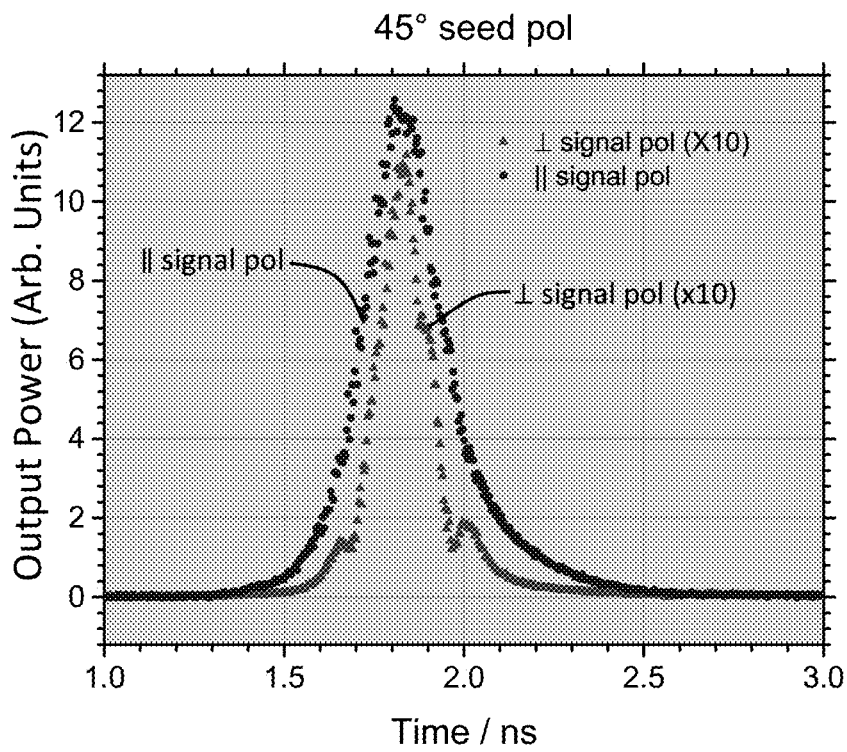
FIG. 7 is another plot of output power versus time for different polarization states.

Referring to FIGS. 6 and 7 plots are shown of power content for orthogonal linear polarization states in an amplification system output beam. For FIG. 6, a seed beam is optically coupled to a chirally coupled core fiber amplifier with the input polarization state of the seed beam aligned with a birefringent axis of the chirally coupled core fiber amplifier. As can be seen from the plot, the output beam has an inconsistent polarization in the time domain. Over the course of an approximately 500 ps pulse (FWHM), the power content of a vertically aligned polarization state includes three peaks, at about 100 ps, 250 ps and 400 ps, while the power content of a horizontally aligned polarization state includes two peaks at about 200 ps and 300 ps. The non-uniform polarization caused by a nonlinear polarization effect is generally undesirable as many applications and nonlinear conversion techniques require a pure linear polarization state. For FIG. 7, the seed beam is coupled to the chirally coupled core fiber amplifier with the seed beam input linear polarization state positioned at 45 degrees to a birefringent axis instead of being position at 0 degrees therewith. As shown in the plot, the temporal shapes of horizontal and vertical polarization states are similar to each other and to the temporal shape of the pulse. Since the horizontal polarization is shown in the Figure at 10× magnification, it can be seen that a substantial amount of the power content of the amplified output pulse is contained in only one linear polarization state, a generally desirable outcome.

Figure 8:
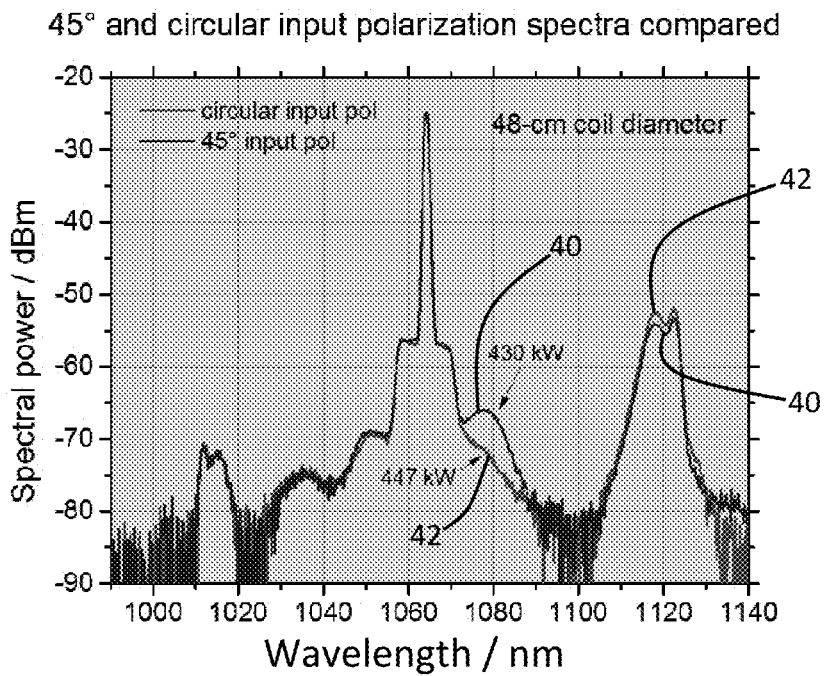
FIG. 8 is a plot of spectral power against wavelength for different input polarizations.

It is also observed that the beneficial effects of a controlled seed beam polarization state can be obtained with a seed beam having a circular polarization state optically coupled to the chirally coupled core fiber amplifier. A similar reduction in nonlinear effects is achieved, as can be seen now with reference to FIGS. 8 and 9. FIG. 8 is a plot of spectral content for highly amplified output beams of a high power fiber amplifier system using active chirally coupled core fiber. The spectral shape 40 of a first output beam with a 45 degree amplifier input polarization and the spectral shape 42 of a second output beam with a circular amplifier input polarization each have minimal power content in side lobes, showing effectively zero impact by nonlinear effects, even with very large output beam peak powers of 430 kW and 447 kW, respectively. With an $R_{coil}$ of 48 cm for the chirally coupled core fiber amplifier, and with a circular amplifier input polarization state in place of a 45 degree angled linear amplifier input polarization state, a small reduction in a first longer wavelength FWM effect and a negligible increase in SRS are seen.

Figure 9:
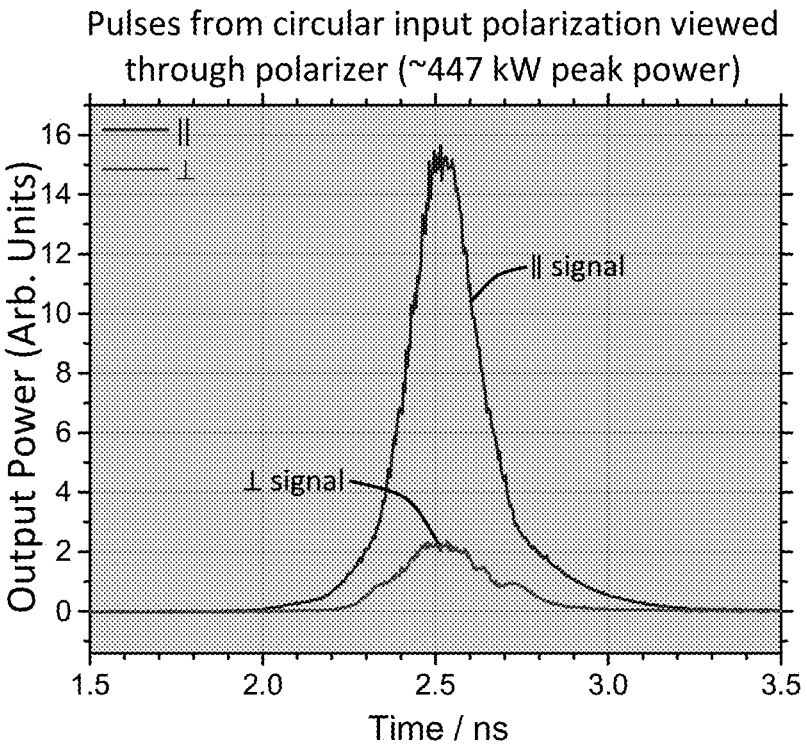
FIG. 9 is another plot of output power versus time for different polarization states.

FIG. 9 shows the power output content for orthogonal linear polarization states of an approximately 447 kW peak power amplifier output beam utilizing a circular amplifier input beam polarization state. As can be seen from the plot, the power content in the horizontal and vertical polarization states of the output pulse, the pulse being formed by the combinative addition of the two states, have a shape similar to the temporal shape of the pulse formed by the addition of the two polarization states. Moreover, one of the orthogonal linear polarization states has substantially more power content than the other. Thus, the nonlinear polarization rotation observed in a high power amplifier output beam produced with an uncontrolled amplifier input polarization launch condition can be substantially reduced or eliminated with a controlled circular amplifier input polarization state. However, while a circular and linear polarization launch condition may provide superior results when coupled into many chirally coupled core fiber amplifier systems, other launch conditions, such as an elliptical polarization launch condition, may also be found to be suitable. For example, system components or environmental factors may cause perturbations in an amplifier system requiring deviations from linear or circular polarization launch coupling. Such perturbations or design variations may be compensated with a controlled elliptical polarization input. In one example, a chirally coupled core fiber amplifier configured without a coiling radius, i.e., the amplifier is straightened, includes an amount of birefringence, polarization rotation, or polarization evolution within a pulse. Accordingly, in this and other examples herein the controlled polarization state input for the chirally coupled core fiber amplifier can provide a stable output polarization in an output beam with minimized nonlinear effects.

Various polarization controllers 38 can be used herein to ensure a suitable polarization state of an amplifier input beam in order to minimize nonlinear effects in an amplifier output beam. Polarization controllers can be conveniently located in proximity to an input of the chirally coupled core amplifier fiber configured as a final or substantial amplification stage, though other locations upstream of a final amplification stage are possible. In one example, the polarization state is determined for a seed beam output from an optical fiber prior to input into the chirally coupled core amplifier fiber portion of a high power amplifier system. For determined polarization states that are linear, the optical fiber emitting the seed beam in the determined polarization state is spliced to an input of the chirally coupled core amplifier fiber such that the polarization state of the amplifier input beam is arranged at a 45 degree angle with respect to a first or second birefringent axis of the amplifier fiber. Thus, in some examples, a polarization controller can include an optical coupling in a predetermined location before or at the input of the chirally coupled core amplifier fiber and at a predetermined orientation between the optically coupled components.

Also, for a seed beam having a particular polarization state, the polarization state of the beam prior to input into the amplifier fiber can be converted to linear, circular, or elliptical with one or more waveplates or effective waveplate devices, such as half-waveplates and quarter-waveplates. Another example of a polarization controller includes a manually or electronically adjustable fiber squeezer operable to selectively apply pressure to a fiber in-line in the high power optical amplification system, such as the input fiber coupled to the chirally coupled core amplifier fiber, to control the polarization state of the beam launched therein. Electronically controlled fiber squeezers are typically controlled via piezoelectric components and are readily available in the optical fiber technology commercial space. Since the optimized polarization state of the beam coupled into the chirally coupled core amplifier fiber can vary as a function of output power, the polarization controller can be configured to dynamically adjust the polarization state as a function of output power or other system characteristic (e.g., pump power, repetition rate, pulse power, output nonlinearity, temperature, seed characteristics, etc.).

Figure 10:
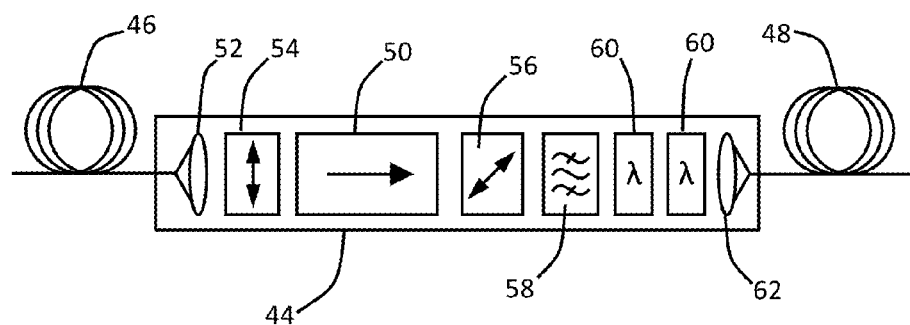
FIG. 10 is a schematic of a polarization controller in accordance with another aspect of the present invention.

In another example, with reference to FIG. 10, a polarization controller 44 is situated between a preamplifier fiber 46 and a chirally coupled core amplifier fiber 48. The polarization controller 44 includes a Faraday rotator 50 configured to rotate the polarization state of an input beam propagating therethrough and to provide optical isolation preventing the propagation of back-reflected light or light propagating in the opposite direction. The preamplifier fiber 46 can be, for example, polarization maintaining large mode area fiber or another chirally coupled core fiber. The beam from the fiber 46 is coupled via coupling optics 52 into the polarization controller 44. A first polarizing element 54 is situated in the beam path and is operative to pass a predetermined linear polarization state. The Faraday rotator 50 utilizes the Faraday effect to rotate the input linear polarization state by a predetermined amount, typically by about 45 degrees in order to provide maximum protection against light propagating in the opposite direction.

A second polarizing element 56 is situated in the beam path after the Faraday rotator 50 and is operative to pass a different predetermined linear polarization state that matches the polarization state output from the Faraday rotator 50. A bandpass filter 58 is situated in the beam path and is operative to filter spectral content outside of a selected wavelength range. One or more waveplates 60, including quarter and half waveplates, are situated in the beam path and allow for various adjustments to the polarization state propagating past the second polarizing element 56. Coupling optics 62 are disposed in the beam path to optically couple the polarization controlled beam into an intermediate fiber or the chirally coupled amplifier fiber 48. The coupled beam is provided in the predetermined polarization state which is optimized to reduce detrimental nonlinear effects in the amplifier output. Thus, because polarization controller 44 also provides optical isolation, an existing laser system component (an isolator) is utilized to provide the additional functionality of polarization control to increase high power amplified beam output and reduce detrimental nonlinear effects.

Figure 11:
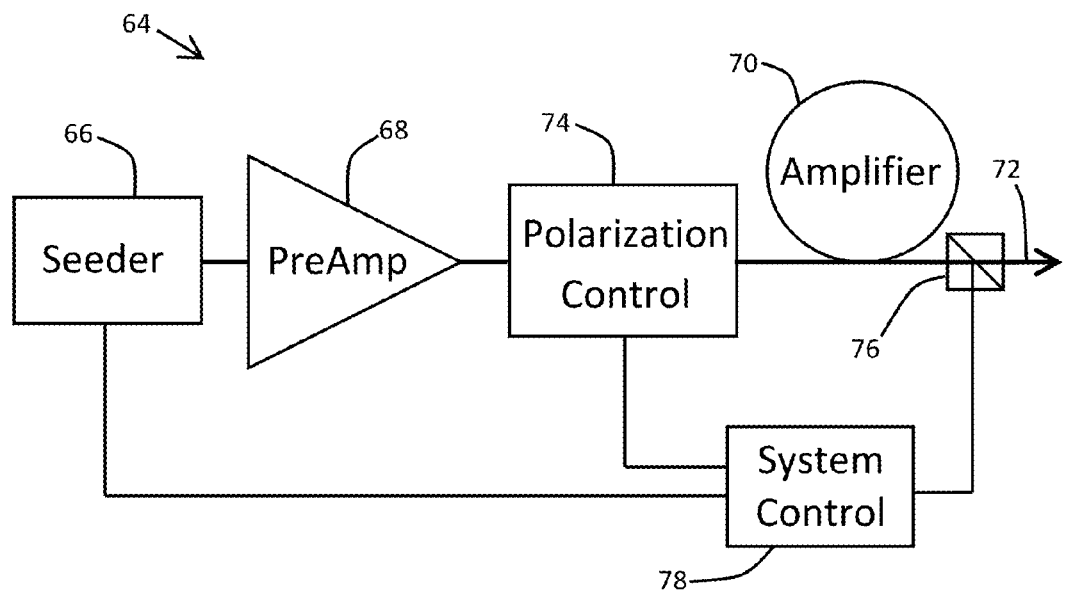
FIG. 11 is a schematic of a high power optical amplification system in accordance with another aspect of the present invention.

FIG. 11 shows another schematic of a high power optical amplification system 64 in accordance with a further aspect of the present invention. System 64 includes a seeder 66 providing seed pulses to one or more fiber amplifier stages 68, 70. It will be appreciated that more than two amplifier stages are possible in order to achieve a highly amplified output beam 72. A polarization control 74 is optically coupled in-line to the series of fiber amplifier stages. The polarization control 74 is configured to select the polarization state launched into the latter fiber amplifier stage 70, which is a chirally coupled core amplifier fiber as described herein, so that detrimental nonlinear effects in the output beam 72 are minimized or reduced while very large peak powers can be obtained in the large mode area fiber. A beam pick-off 76 situated after the chirally coupled core amplifier 70 can be used to separate a portion of the beam 72 for detection in a system controller 78 the characteristics of the output beam, such as beam power, beam shape, beam quality, polarization extinction ratio, polarization power content, etc. Based on the detected output beam characteristics, one or more system components can be dynamically adjusted, including the polarization control, the seeder, pump sources (not shown), etc. For example, at lower output powers, the polarization control 74 can couple a linear polarization state into the chirally coupled core amplifier fiber along a birefringent axis thereof instead of at a 45 degree angle therewith.

Figure 12:
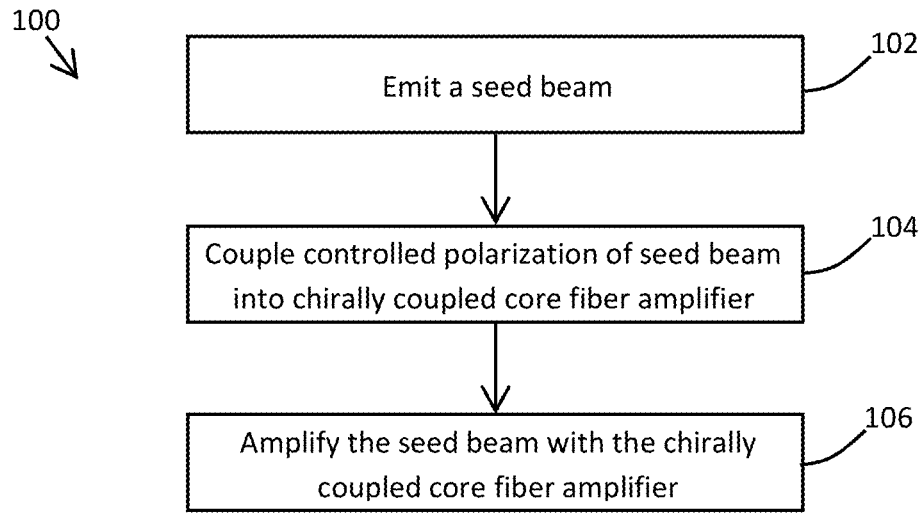
FIG. 12 is a flowchart diagram of a method in accordance with an aspect of the present invention.
Figure 13:
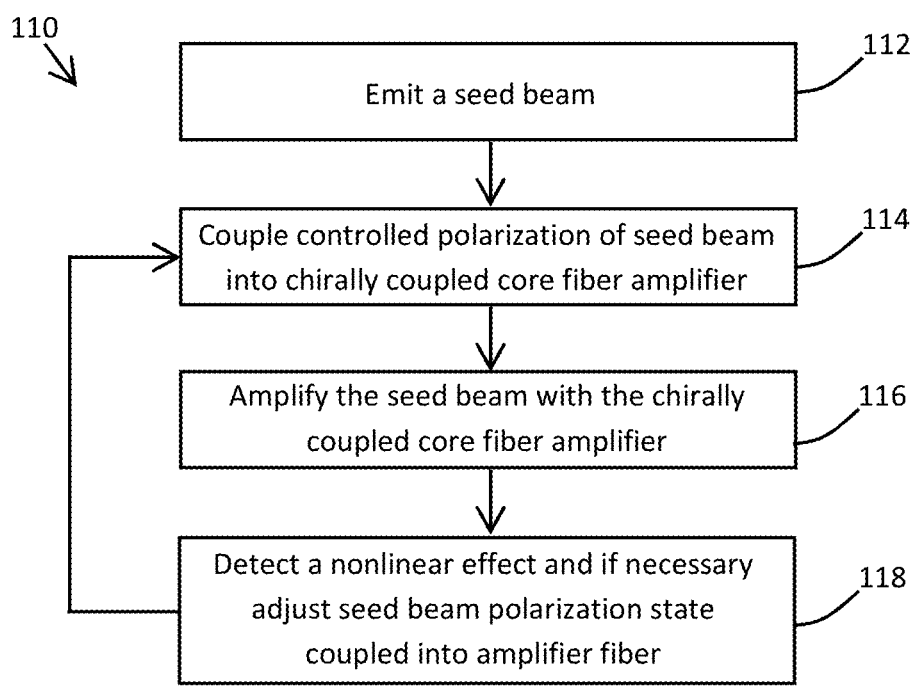
FIG. 13 is a flowchart diagram of another method in accordance with an aspect of the present invention.

FIGS. 12 and 13 are flowcharts showing exemplary methods in accordance with the present invention. In one method 100 a seed beam is emitted at 102 from a seed source, such as a gain switched diode, passively Q-switched laser, or another source. The seed can be emitted at a suitable power level for substantial subsequent amplification, or it can be propagated through one or more amplification and isolation stages. At 104, the polarization state of the seed beam is controlled and coupled into a chirally coupled core fiber amplifier. At 106 the seed beam is amplified by the chirally coupled core fiber amplifier in order to produce a high power output beam having reduced nonlinear power content as compared to the output having an uncontrolled polarization state launch condition coupled into the chirally coupled amplifier fiber. For example, the seed beam coupled into the chirally coupled core fiber amplifier can have the polarization state thereof aligned at 45 degrees with respect to a birefringent axis of the chirally couple core fiber amplifier. In another example, the in-coupled polarization state of the seed beam coupled into the chirally coupled core fiber amplifier can be configured as circular or elliptical, either clockwise or counter-clockwise. The polarization state can also be controllably adjusted according to the desired power output of the high power optical amplification system. In another method 110, a seed beam is emitted at 112 from a seed source. The polarization state of the seed beam is controlled at 114 and coupled into a chirally coupled core fiber amplifier, and at 116 the beam becomes amplified therein. At 118, nonlinear beam content is detected in the output beam and the polarization of the seed beam coupled into the chirally coupled core fiber amplifier is controllably adjusted to reduce the aforementioned nonlinear content.

Figure 14:
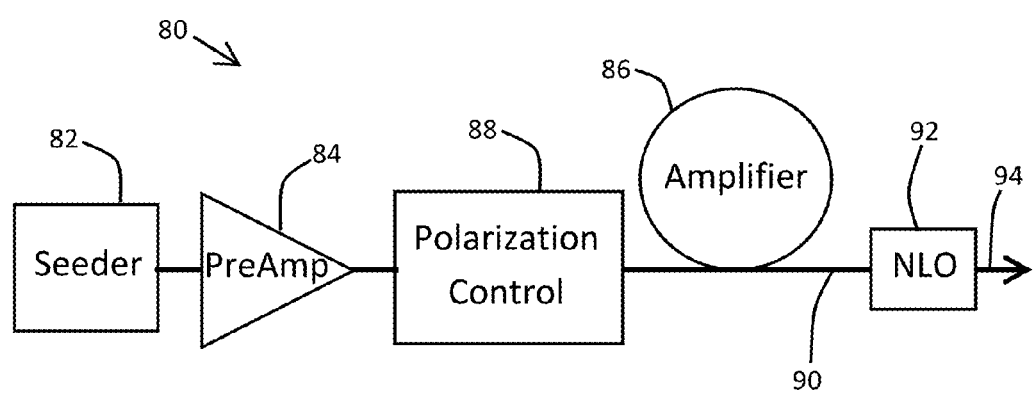
FIG. 14 is a schematic of a high power optical amplification system in accordance with another aspect of the present invention.

FIG. 14 is a schematic depicting an example of a high power optical amplification system 80 for frequency conversion. The system 80 includes an optical seed source 82 configured to emit seed pulses to form a seed beam. The seed beam is amplified by one or more amplification stages 84, 86. A polarization control 88 is coupled to the path of the seed beam, preferably at the coupling to the final largest amplification stage 86 so that the polarization of the seed beam is launched into the amplifier 86 with a predetermined polarization, including linear, circular, or elliptical so that nonlinear content in an output beam 90 from the amplifier 86 is suppressed or enhanced. A nonlinear optical element 92 is coupled to the output beam 90 of the amplifier 86 and configured to frequency convert the incident pulses to a frequency converted output beam 94 at different predetermined frequency.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

What is claimed is:

1. An optical amplification system, comprising:
    a seed source providing a seed beam, the seed beam having a predetermined polarization state; and
    a coiled chirally coupled core fiber amplifier optically coupled to the seed beam having the predetermined polarization state, the chirally coupled core fiber amplifier being situated to convert the coupled seed beam into an amplifier output beam with reduced nonlinearities due to the predetermined polarization state optically coupled to the chirally coupled core fiber amplifier,
    wherein the polarization state of the seed beam is linear and is launched into said chirally coupled core fiber amplifier at an angle of 45 degrees with respect to a birefringent axis thereof.

2. The system of claim 1, further comprising:
    a polarization controller optically coupled between said seed source and said chirally coupled core fiber amplifier and configured to provide the predetermined polarization state of the seed beam optically coupled into said chirally coupled core fiber amplifier.

3. The system of claim 1 wherein the seed beam is launched into said chirally coupled core fiber amplifier with a circular polarization.

4. The system of claim 1 wherein the seed beam is launched into said chirally coupled core fiber amplifier with an elliptical polarization.

5. The system of claim 1 wherein the amplifier output beam is substantially single-mode and has a peak power of about 250 kW or greater.

6. The system of claim 1 wherein the amplifier output beam has a polarization extinction ratio of 3 dB or greater.

7. The system of claim 1 wherein the amplifier output beam has a stable polarization state.

8. The system of claim 1 further comprising a nonlinear optical element optically coupled to the amplifier output beam for converting the optical frequency thereof.

9. An optical amplification system, comprising:
    a seed source providing a seed beam, the seed beam having a predetermined polarization state;
    a chirally coupled core fiber amplifier optically coupled to the seed beam having the predetermined polarization state, the chirally coupled core fiber amplifier being situated to convert the coupled seed beam into an amplifier output beam with reduced nonlinearities due to the predetermined polarization state optically coupled to the chirally coupled core fiber amplifier; and
    a variable polarization controller optically coupled between said seed source and said chirally coupled core fiber amplifier and configured to provide the predetermined polarization state of the seed beam optically coupled into said chirally coupled core fiber amplifier.

10. The system of claim 9 wherein said chirally coupled core fiber amplifier is coiled.

11. The system of claim 10 wherein the predetermined polarization state of the seed beam is linear and is launched into said chirally coupled core fiber amplifier at an angle of 45 degrees with respect to a birefringent axis thereof.

12. The system of claim 9 wherein said polarization controller is a variable polarization controller with dynamic feedback.

13. An optical amplification system, comprising:
    a seed source providing a seed beam, the seed beam having a predetermined polarization state;
    a chirally coupled core fiber amplifier optically coupled to the seed beam having the predetermined polarization state, the chirally coupled core fiber amplifier being situated to convert the coupled seed beam into an amplifier output beam with reduced nonlinearities due to the predetermined polarization state optically coupled to the chirally coupled core fiber amplifier; and
    a polarization controller optically coupled between said seed source and said chirally coupled core fiber amplifier and configured to provide the predetermined polarization state of the seed beam optically coupled into said chirally coupled core fiber amplifier,
    wherein said polarization controller is an in-line optical isolator providing a polarization adjustable output.

14. An optical amplification system, comprising:
    a seed source providing a seed beam, the seed beam having a predetermined polarization state;
    a chirally coupled core fiber amplifier optically coupled to the seed beam having the predetermined polarization state, the chirally coupled core fiber amplifier being situated to convert the coupled seed beam into an amplifier output beam with reduced nonlinearities due to the predetermined polarization state optically coupled to the chirally coupled core fiber amplifier; and
    a piezoelectrically controlled polarization controller optically coupled between said seed source and said chirally coupled core fiber amplifier and configured to provide the predetermined polarization state of the seed beam optically coupled into said chirally coupled core fiber amplifier.

15. A high power master oscillator fiber amplifier system, comprising:
    a master oscillator seed source providing a seed beam having a predetermined polarization state; and
    a chirally coupled core fiber amplifier optically coupled to the seed beam having the predetermined polarization state, the chirally coupled core fiber amplifier being situated to provide an amplified output beam and being coiled at a coiled radius and having a pair of orthogonal birefringence axes associated with the coiling of the chirally coupled core fiber amplifier;
    wherein the predetermined polarization state of the seed beam coupled into said chirally coupled fiber amplifier is situated to reduce nonlinearities in the amplified output beam.

16. The system of claim 15, further comprising:
    a polarization controller configured to select a polarization state of the seed beam for coupling into said chirally coupled core fiber amplifier.

17. The system of claim 16 wherein said polarization controller is an in-line optical isolator providing a polarization adjustable output.

18. The system of claim 15 wherein the amplified output beam is substantially single-mode and has a peak power of about 450 kW or greater.

19. A method of optical amplification with a chirally coupled core fiber, comprising:
    emitting a seed beam from a seed source;
    coupling a predetermined polarization state of the seed beam into a chirally coupled core fiber amplifier in order to optimize the amplified output thereof; and
    amplifying the coupled seed beam with the chirally coupled core amplifier;
    wherein the predetermined polarization state of the seed beam is linear and the linearly polarized seed beam is coupled into the chirally coupled core amplifier at 45 degrees with respect to a birefringent axis thereof.

20. The method of claim 19 further comprising:
frequency converting the amplified output beam with a nonlinear optical element.

21. A method of optical amplification with a chirally coupled core fiber, comprising:
emitting a seed beam from a seed source;
coupling a predetermined polarization state of the seed beam into a chirally coupled core fiber amplifier in order to optimize the amplified output thereof; and
amplifying the coupled seed beam with the chirally coupled core amplifier,
wherein the predetermined polarization state is controlled by selecting a splice orientation between the chirally coupled core fiber amplifier and an input fiber providing the seed beam thereto.

22. The method of claim 21, wherein the predetermined polarization state of the seed beam is linear and the linearly polarized seed beam is coupled into the chirally coupled core amplifier at 45 degrees with respect to a birefringent axis thereof.

23. The method of claim 21, wherein the predetermined polarization state of the seed beam is circular.

24. The method of claim 21, wherein the predetermined polarization state of the seed beam is elliptical.

25. A method of optical amplification with a chirally coupled core fiber, comprising:
emitting a seed beam from a seed source;
coupling a predetermined polarization state of the seed beam into a chirally coupled core fiber amplifier in order to optimize the amplified output thereof; and
amplifying the coupled seed beam with the chirally coupled core amplifier,
detecting one or more nonlinear characteristics of the amplified output beam; and
adjusting the seed beam predetermined polarization state coupled to the chirally coupled core fiber amplifier based on the detected nonlinear characteristics in order to reduce the same.

26. A method of optical amplification with a chirally coupled core fiber, comprising:
emitting a seed beam from a seed source;
coupling a predetermined polarization state of the seed beam into a chirally coupled core fiber amplifier in order to optimize the amplified output thereof; and
amplifying the coupled seed beam with the chirally coupled core amplifier,
wherein the coupled polarization is dynamically controlled based on a power level of the amplified output.

* * * * *